Oct. 4, 1932.  J. A. WHITE  1,880,616
FRICTION CLUTCH
Filed Oct. 1, 1930  2 Sheets-Sheet 1

Oct. 4, 1932.    J. A. WHITE    1,880,616
FRICTION CLUTCH
Filed Oct. 1, 1930    2 Sheets-Sheet 2

Inventor:
Joseph A. White
by his Attorneys
Howson & Howson

Patented Oct. 4, 1932

1,880,616

UNITED STATES PATENT OFFICE

JOSEPH A. WHITE, OF MELROSE PARK, PENNSYLVANIA, ASSIGNOR TO THE MOORE & WHITE COMPANY, OF PHILADELPHIA, PENNSYLVANIA, A CORPORATION OF PENNSYLVANIA

FRICTION CLUTCH

Application filed October 1, 1930. Serial No. 485,710.

My invention relates to certain improvements in clutches of the type in which a hub is mounted so as to freely rotate on a shaft, the said hub having a shell, the hub being shaped so as to receive a pulley. The hub in some instances may be keyed to a second shaft in alignment with the first shaft.

One object of my invention is to simplify the construction of friction clutches of this type and to provide means for positively moving the pressure ring into and out of contact with the friction members, and to provide means for adjusting the ring in respect to said friction members.

A still further object of the invention is to pivot the operating levers to the keys upon which the ring and the intermediate member or members slide, said ring being secured to the hub that is fixed to the shaft.

In the accompanying drawings:—

Figure 4:
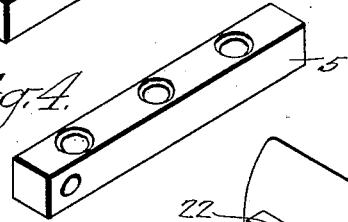
Fig. 4 is a detached perspective view of one of the hub keys.

1 is a shaft to which is secured a hub 2, adapted to a key-way 3 in the present instance, and on this hub is an annular flange 4 forming the fixed abutment of the clutch. 5 are keys, which are of the shape shown in Fig. 4. These keys are secured to the hub 2, in the present instance, by rivets 6, although in some instances they may be welded directly to the hub. Arranged to slide upon the hub 2 is a pressure ring 7. The ring has a web 8 notched to fit over the keys 5, so that while the ring is free to move longitudinally on the hub, it is prevented from turning independently of the hub. 9 is an intermediate pressure disk, also having key-ways for the keys 5, so that while the ring is free to slide longitudinally on the hub, it must turn therewith. While I have shown only one intermediate disk 9, there may be a series of these disks, according to the size of the clutch. 10 is a shell mounted to turn freely on the shaft 1. This shell has an extended hub 11, to which a pulley can be secured, but in some instances where a shaft is to be driven from the driving shaft, it may align with the said driving shaft and be secured to the hub 11 of the shell 10. This is a well-known form of construction.

The shell 10 has a deep flange 12, which extends over the pressure disk 9 and a portion of the pressure ring 7, and secured to this shell are keys 13, which may be secured to the shell by rivets 14, or may be welded thereto as desired.

Figure 1:
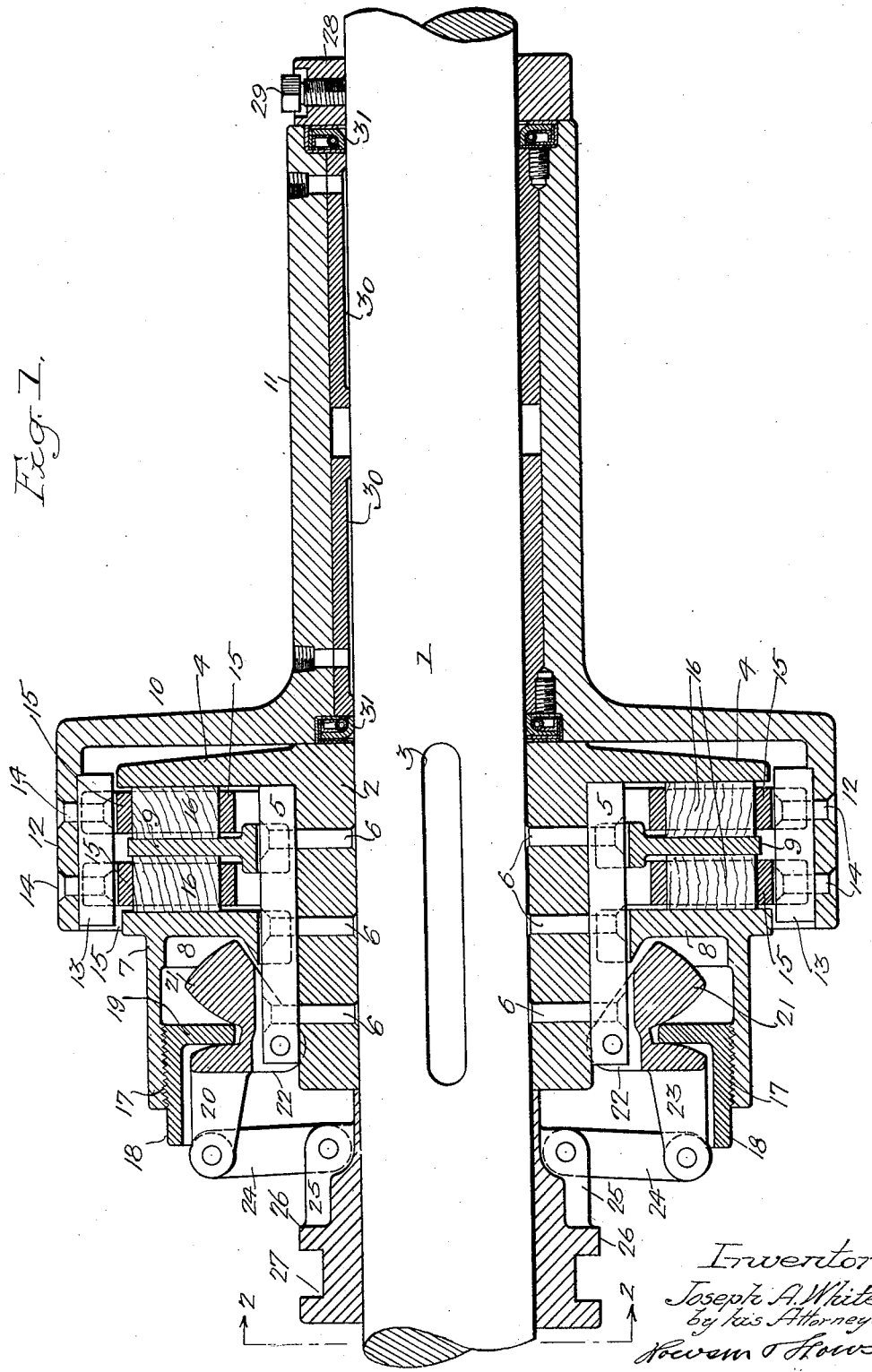
Fig. 1 is a longitudinal sectional view of my improved clutch.
Figure 2:
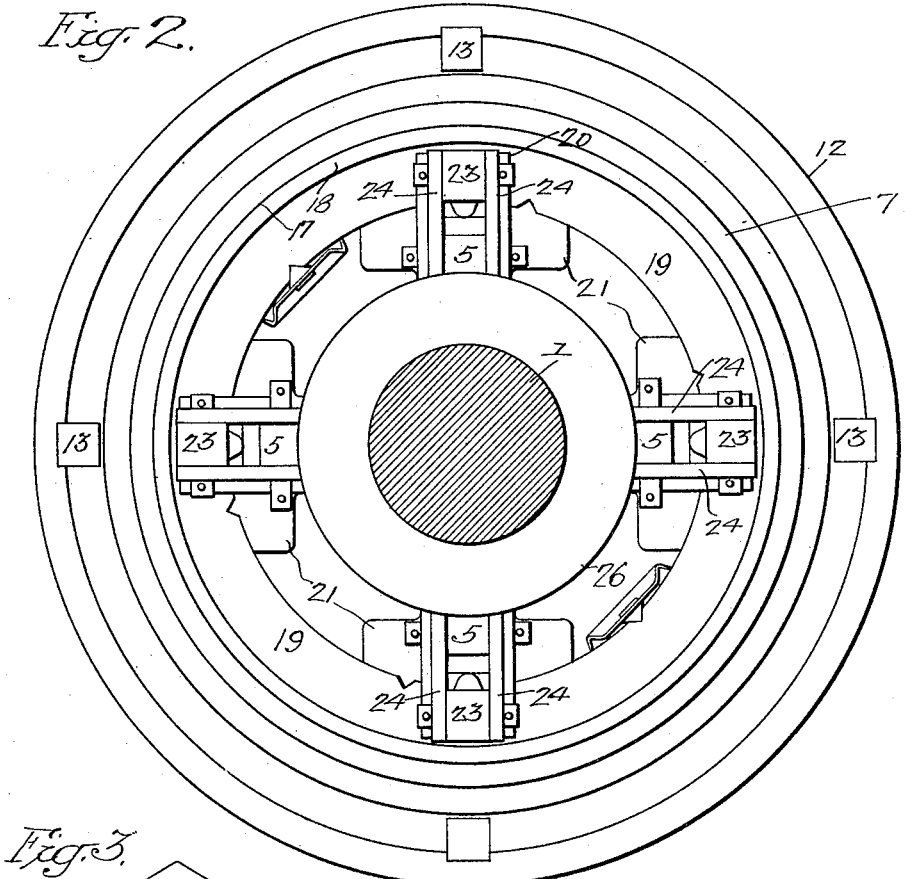
Fig. 2 is a sectional view on the line 2—2, Fig. 1.
Figure 3:
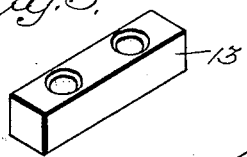
Fig. 3 is a detached perspective view of one of the shell keys.

Mounted between the abutment 4, the pressure ring 7 and the intermediate disk 9, are friction block carriers. These carriers 15 are notched at their periphery for the keys 13 of the shell 10, so that the carriers must turn with the shell but are free to slide longitudinally therein. Mounted in recesses of each carrier is a series of segmental friction blocks 16. The ends of the blocks project beyond the carriers so as to come into contact with the abutment 4, disk 9 and pressure ring 7, as indicated in Fig. 1. These blocks are preferably made of wood, but they may be made of any other frictional material without departing from the essential features of the invention.

Pivoted to the keys 5 are operating levers 22 having two controlling members 20 and 21. By pivoting the controlling levers on the keys 5, the controlling levers can be fitted to the keys prior to the keys being secured to the hub, so that the parts can be readily and accurately assembled.

Figure 5:
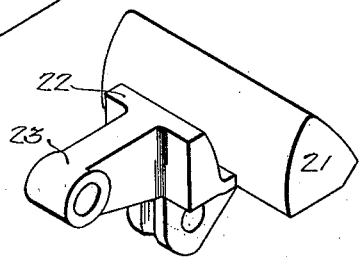
Fig. 5 is a detached perspective view of one of the levers that actuate the clutch ring.

The pressure ring has an internal screw thread 17 and adapted to the thread is an adjustable ring 18 having an internal flange 19 at its inner end. This flange fits between two controlling members 20 and 21 of operating levers 22, shown in Fig. 5. There are in the present instance four of these operating levers which engage the internal flange 19 of the adjustable ring, but the number of these levers will vary according to the size of the clutch. Projecting from each controlling member 20 is an arm 23, which is connected by links 24 to lugs 25 on the sliding collar 26, grooved at 27 to receive the ordinary shifting lever (not shown). It will be noticed that the inner controlling member 21 is much heavier than the controlling member 20, and acts as a counterbalance for the arm 23 of the lever, so that when the clutch is rotated there will be no movement of the levers due to centrifugal force, as one section of the lever balances the other.

The shell 10 and its hub 11 are mounted on the shaft between the hub 2 and a collar 28, secured to the shaft by a set-screw 29. In the hub 11 are bushings 30, which in the present instance fit the shaft and are secured to the hub. The bushings are grooved for the reception of oil or other lubricant, and at each end of the hub 11 are flexible washers 31, which prevent the lubricant from flowing beyond the hub.

This construction may be modified without departing from the essential features of the invention.

While blocks are shown in the carriers, the carriers may be solid and faced with any suitable friction material, and while one pressure disk is shown, more than one disk may be used, or in some instances the disk may be dispensed with and a single carried used.

I claim:

1. The combination in a friction clutch, of a shaft; a hub secured to the shaft and having an abutment; a pressure ring and an intermediate pressure disk arranged to slide longitudinally on the hub and to turn therewith; a shell; friction members arranged to turn with the shell but to slide longitudinally therein, said fricton members located between the pressure disk and the pressure ring and the abutment on the hub; a ring adjustably mounted in the pressure ring and having an inturned flange; a series of operating levers, each lever having two controlling members, one on one side of the inturned flange of the adjustable ring and the other on the opposite side thereof, so as to positively move the adjustable ring and the pressure ring towards and from the friction members; and means for operating the levers in unison.

2. The combination in a friction clutch, of a shaft; a hub secured thereto, having an abutment; a pressure disk and a pressure ring arranged to slide longitudinally on the hub but to turn therewith; a shell; friction members arranged to slide longitudinally in the shell but to turn therewith, said friction members mounted between the pressure disk and the abutment on one side and the pressure ring on the opposite side; an adjustable ring having an inturned flange; a series of levers, each lever having an outer controlling member and an inner controlling member, one member being mounted on the one side of the inturned flange and the other on the opposite side thereof; an arm projecting from the outer controlling member; a sliding collar on the shaft; and links connecting the sliding collar with the arms of the levers, the inner controlling members being weighted to counterbalance the outer members and their arms, so that the levers will not be affected by centrifugal action.

3. The combination in a friction clutch of the disk type, of a shaft; a hub secured to the shaft; keys secured to the hub; a pressure ring mounted to slide on the hub, but engaged by the keys so as to turn with the hub; balanced operating levers for positively moving the pressure ring in either direction, said levers beng pivotally mounted on the keys; and means for operating the levers.

JOSEPH A. WHITE.